3,498,946
PIGMENTED POLYCARBONATE STABILIZED WITH PHOSPHITES AND ION EPOXIDIZED CARBOXYLATE
Thornton R. Calkins, Evansville, Ind., assignor to General Electric Company, a corporation of New York
No Drawing. Filed Aug. 3, 1965, Ser. No. 477,018
Int. Cl. C08g 51/58, 51/04
U.S. Cl. 260—37        11 Claims

ABSTRACT OF THE DISCLOSURE

A pigmented polycarbonate composition which is stable to heat, light and discoloration wherein the polycarbonate has in admixture therewith a metal oxide pigment which can withstand in excess of 200° F., an organic phosphite or mixtures of organic phosphites and an epoxidized dicycloalkyl carboxylate. The combination of epoxidized dicycloalkyl aliphatic carboxylate and organic phosphite cannot exceed 0.40% based on the total weight of the composition.

---

This invention relates to stable, pigmented polymeric compositions. More particularly, this invention relates to heat and color stable, pigmented polycarbonate compositions wherein the pigment includes a metal oxide and the stabilizer consists of one or more organic phosphites and in one embodiment, a mixture of one or more organic phosphites and an epoxidized dicycloaliphatic carboxylate.

Polycarbonates are well-known, commercially available materials having a variety of applications in the plastics art. Such carbonate polymers may be prepared by reacting a dihydric phenol such as, for example, 2,2'-bis-(4-hydroxyphenyl)-propane (Bisphenol A) with a carbonate precursor such as phosgene, in the presence of an acid acceptor. Generally speaking, aromatic polycarbonate resins offer a high resistance to the attack of mineral acids, may be molded, and are physiologically harmless as well as stain resistant. In addition, such polymers have high impact strength, and a dimensional stability surpassing that of any other commercially available thermoplastic material. The properties of the polycarbonates render them amenable to a wide variety of consumer and industrial applications.

For many commercial applications, it is necessary to add a pigment or colorant to the basic polymer formulations to enhance their appearance. Metal oxides such as, for example, titanium dioxide and zinc oxide have become universal pigments because of their stability and high opacity. In addition, they have excellent resistance to light, heat, acid, alkalies, and generally, to oxidation and reduction. Furthermore, they may be used in conjunction with other pigments and dyes to provide polymeric formulations having a wide variety of colors. There is, however, one very serious limitation on the use of metal oxides in polycarbonate compositions. It has been found that many of the physical properties of polycarbonates are substantially reduced when metal oxides are added. As a result, the pigment content must be maintained at a low level when a strong, tough plastic material is required, limiting the variety and intensity of colors producible.

It has now unexpectedly been found that decreases in physical properties due to the addition of a metal oxide pigment to a polycarbonate can be substantially reduced by the further addition of an additive selected from the group consisting of organic phosphites, mixtures of organic phosphites and mixtures of organic phosphites and an epoxidized dicycloaliphatic carboxylate. This is particularly surprising as addition of these same materials to unpigmented polycarbonates can cause degradation of these same physical properties. This suggests that the above-noted additive and the metal oxide interact in some manner to protect the polymer composition against degradation of physical properties. In addition to arresting the degradation of the physical properties of the polycarbonate composition, the additive also acts to stabilize the polycarbonate against discoloration due to light and heat both during and after processing. Thus, by adding an epoxidized cycloaliphatic carboxylate and/or one or more organic phosphites to a polycarbonate composition containing a metal oxide pigment, it is possible to provide stable, pigmented polycarbonate compositions suitable for a wide variety of consumer and industrial applications.

Accordingly, one object of this invention is to provide a method for arresting the degradation of physical properties of a polycarbonate caused by the addition of a metal oxide pigment.

Another object of this invention is to provide a stable pigmented polycarbonate composition.

A third object of this invention is to provide a material for addition to polycarbonates containing a metal oxide pigment which reacts with the material to reduce degradation of the polymer properties.

Other objects and advantages of this invention will be in part apparent and in part pointed out in the description which follows.

The objects of this invention are achieved by adding an additive selected from the group consisting of organic phosphites and mixtures of organic phosphites with an epoxidized dicycloaliphatic carboxylate to a polycarbonate composition containing a metal oxide pigment. As used throughout the remainder of the disclosure, the expression "phosphite additive" refers to the above-noted phosphite-carboxylate composition.

The expression "polycarbonate" as used herein is meant to embrace within its scope carbonate polymers of dihydric phenols as well as carbonate copolymers of such dihydric phenols with glycols, such as ethylene glycol or propylene glycol, for example dibasic acids, such as, for example, isophthalic or terephthalic acid; and hydroxyl or acid terminated polyesters, such as, for example, the hydroxyl or acid terminated polyester of neopentyl glycol and adipic acid. Such polycarbonate resins may be prepared by reacting a dihydric phenol with a carbonate precursor such as phosgene, a haloformate or a carbonate ester. Generally speaking, the resulting carbonate polymers may be typified as possessing recurring structural units of the formula:

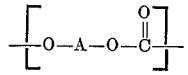

wherein A is a divalent aromatic radical of the dihydric phenol employed in the polymer producing reaction. Preferably, the polycarbonate resins have intrinsic viscosities (as measured in p-dioxane in deciliters per gram at 30° C.) ranging from about 0.35 to 1.30. The dihydric phenols which may be employed to provide such aromatic carbonate polymers are mononuclear or polynuclear aromatic compounds containing as functional groups, two hydroxyl radicals, each of which is attached directly to a carbon atom of an aromatic nucleus. Typical dihydric phenols are 2,2'-bis-(4-hydroxyphenyl)-propane; hydroquinone; resorcinol; 2,2'-bis-(4-hydroxyphenyl)-pentane; 2,4'-dihydroxydiphenyl methane; bis-(2-hydroxyphenyl)-methane; bis-(2-hydroxy-3-chlorophenyl)-propane; bis-(4-hydroxyphenyl)-methane; bis-(4-hydroxy - 5 - nitrophenyl)-methane; 1,1'-bis-(4-hydroxyphenyl)-ethane; 1,1'-bis-(3 - bromo-4-hydroxyphenyl)-ethane; 3,3'-bis-(4 - hydroxyphenyl)-pentane; 2,2'-dihydroxydiphenyl; 2,6-dihydroxynaphthalene; bis-(4-hydroxyphenyl)-sulfone; bis-(4-hydroxy-5-chlorophenyl)-sulfone; 2,4'-dihydroxydiphenyl sulfone; 4,4'-dihydroxydiphenyl ether; and 4,4'-dihydroxy-2,5-diethoxydiphenyl ether. A variety of additional dihydric phenols which may be employed to provide such carbonate polymers are disclosed in U.S. Patent No. 2,999,835, of Eugene P. Goldberg, assigned to the assignee of the present invention. It is, of course, possible to employ two or more different dihydric phenols or, as stated above, a dihydric phenol in combination with a glycol, a hydroxy or acid-terminated polyester, or a diabasic acid in the event a carbonate copolymer rather than a homopolymer is desired.

When a carbonate ester is used as the carbonate precursor in the polymer-forming reaction, the materials are reacted at temperatures of from 100° C. or higher for times varying from 1 to 15 hours. Under such conditions, ester interchange occurs between the carbonate ester and the dihydric phenol used. The ester interchange is advantageously consummated at reduced pressures of the order of from about 0.10 to 100 mm. of mercury, preferably in an inert atmosphere, such as nitrogen or argon for example.

Although the polymer-forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Syntheses" (fourth edition, McGraw-Hill Book Company, 1952), pages 616 to 620. The amount of such catalyst, if used, is usually small, ranging from about 0.001 to about 0.1 percent, based on the moles of the dihydric phenol employed. The carbonate ester useful in this connection may be aliphatic or aromatic in nature, although aromatic esters, such as diphenylcarbonate, are preferred. Additional examples of carbonate esters which may be used are dimethyl carbonate, diethyl carbonate, phenylmethyl carbonate, phenyltoyly carbonate and di(tolyl) carbonate.

A preferred method for preparing the carbonate polymers involves the use of a carbonyl halide, such as phosgene, as a carbonate precursor. The method involves passing phosgene gas into a reaction mixture containing the dihydric phenol in an acid acceptor such as a tertiary amine, e.g., pyridine, dimethylaniline, quinoline, etc. The acid acceptor may be used undiluted or diluted with inert organic solvents, as for example, methylene chloride, chlorobenzene, 1,2-dichloro ethane. Tertiary amines are advantageous since they are good solvents as well as acid acceptors during the reaction period.

The temperature at which the carbonyl halide reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and 2 moles of HCl. Two moles of HCl are in turn "attached" by the acid acceptor present. The foregoing are herein referred to as stoichiometric or theoretical amounts.

Another method of preparing the carbonate polymers comprises adding phosgene to an alkaline aqueous suspension of the dihydric phenol used. This is preferably done in the presence of inert solvents such as methylene chloride, 1,2-dichloroethane and the like. Quaternary ammonium compounds may be employed to catalyze the reaction.

A fourth method for preparing such carbonate polymers involves the phosgenation of an agitated suspension of the anhydrous alkali salt of the dihydric phenol used in a non-aqueous medium such as benzene, chlorobenzene, and toluene. The reaction is illustrated by the addition of phosgene to a slurry of the sodium salt of 2,2'-bis-(4-hydroxyphenyl)-propane in an inert polymer solvent such as chlorobenzene. The organic solvent should be preferably a polymer solvent but need not necessarily be a good solvent for the reactants.

Generally speaking, a haloformate, such as the bishaloformate of 2,2'-bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whereas aqueous base or pyridine is used as an acid acceptor. The polymer may be precipitated from the solution by adding a polymer non-solvent, such as heptane or isopropanol. Alternatively, the polymer solution may be heated to evaporate the solvent.

The expression "organic phosphite" as used throughout the disclosure and in the claims is meant to embrace within its scope phosphites and mixtures of phosphites conforming to the following general formulae:

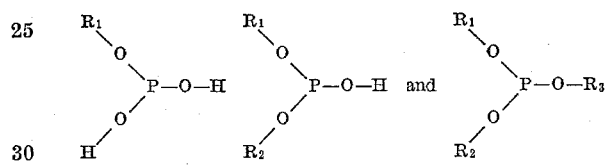

wherein $R_1$, $R_2$ and $R_3$ in each of the above formulae represent organic aliphatic, monocyclic aromatic or allicyclic monocyclic hydrocarbon radicals having from 1 to 25 carbon atoms. $R_1$, $R_2$ and $R_3$ may be the same or different. As exemplary of these phosphites, there are suggested the following: dibutyl phenyl phosphite, butylphosphite, diphenyl butylphosphite, diphenyl phosphite, triphenyl phosphite, hexyl phosphite, diheptyl phosphite, diphenylhexylphosphite, diphenyl nonyl phosphite, dinonylphosphite, diphenyl decyl phosphite, diphenyl dodecyl phosphite, didodecyl phosphite, 2-phenylethyl phenyl hexyl phosphite, 2-phenylethyl phosphite, di-2-phenyl methyl decyl phosphite, didecyl phenyl phosphite, di-2-ethyl decyl phenyl phosphite, tridecylphosphite, dicresyl decyl phosphite, di-(o-iso-octylphenyl)-decyl phosphite, di-(dimethylphenyl)phenylphosphite, trihexylphosphite, didecyl nonyl phosphite, di-(2-methyl-decyl)-cresyl phosphite, dicyclohexylphenylphosphite, dicyclopentyl decyl phosphite, ditolyl decyl phosphite, tri-(p-t-octylphenyl)-phosphite, tri-(p-t-nonylphenyl)-phosphite, isobutyl dicresyl phosphite, etc.

The preferred organic phosphites for use in the practice of the present invention are triphenylphosphite, diphenyldecyl phosphite and phenyl didecyl phosphite. The most preferred phosphite composition is a mixture of organic phosphites consisting of 1 part triphenylphosphite, 1 part phenyl didecyl phosphite and 2 parts diphenyldecyl phosphite.

The concentration of the phosphite should vary between 0.01 and 0.30 percent, by weight, and preferably between 0.02 and 0.15 percent of the total composition.

For many uses, it has been found desirable to include an epoxidized dicycloaliphatic carboxylate as one component of the stabilizing composition. Such epoxidized carboxylates include, but are not limited to:

3,4-epoxycyclohexylmethyl-3,4-epoxycyclohexane carboxylate;
2,3-epoxycyclopentyl-3,4-epoxycyclohexane carboxylate;
3,4-epoxy-6-methylcyclohexylmethyl-3,4-epoxy-6-methylcyclohexane carboxylate;
2,3-epoxy-4-ethylcyclohexylethyl-2,3-epoxy-4-ethylcyclopentane carboxylate;
3,4-epoxycycloheptylpropyl-3,4-epoxy-5-methylcyclohexane carboxylate;

2,3-epoxycyclohexylmethyl-3,4-epoxycyclohexane carboxylate;
2-chloro-3,4-epoxycyclohexylethyl-3,4-epoxycyclohexane carboxylate;
3,4-epoxy-5-methylcyclohexylbutyl-3,4-epoxycyclohexane carboxylate.

The concentration of the epoxidized carboxylate should range from approximately 0.0 to 0.30 weight percent and preferably from 0.01 to 0.25 percent of the entire composition, provided the total concentration of organic phosphite and epoxidized carboxylate does not exceed 0.40 percent.

Generally speaking, those metal oxide pigments known in the art that are able to withstand temperatures in excess of 200° F. are suitable for purposes of the present invention. Such metal oxides include, but are not limited to, titanium dioxide, zinc oxide, lead oxide, lead chromate, etc. The pigment should be in the form of a finely divided powder to insure complete dispersion in the polycarbonate. In addition to the metal oxide pigment, other colorants, both organic and inorganic, may be added to the polycarbonate composition to obtain any desired coloration. Suitable colorants include, but are not limited to, nickel titanium yellow, cadmium-sulfo-selenide, strontium chromate, phthalocyanine, quinacradone, carbon black, naphthol red, benzidine yellow, etc.

The manner of dispersing the pigment and phosphite additive in the polycarbonate is not critical. However, the process chosen should be one which results in as great a degree of dispersion of all of the additives in the plastic as possible. For example, the mixing of materials may be accomplished by any one of the variety of methods normally employed for incorporation of fillers, common modifiers, etc. Such methods include, but are not limited to, the use of mixing rolls, ribbon blenders, dough mixers, Banbury mixers, extruders, and other mixing equipment. The resulting mixture may be handled in any conventional manner employed for the fabrication or manipulation of thermoplastic resins. The mixtures can be formed or molded using compression molding, injection molding, calendering, and extrusion techniques.

The phosphite additive and the metal oxide may be added simultaneously or sequentially by any of the methods listed above, or the additive alone may be added to the polycarbonate by dissolving both the phosphite and polycarbonate in a common solvent, such as methylene chloride, and evaporating the solvent to leave a residue of the phosphite dispersed in polycarbonate. The metal oxide may then be added to the stabilized composition by any of the methods listed above. In addition, a powder blend of the polycarbonate and pigment may be formed and a solution of the phosphite additive added thereto.

The quantity of organic phosphite and epoxidized dicycloaliphatic carboxylate that is added to the polycarbonate may vary between 0.01 to 0.40 percent, by weight, of the entire composition, but best results are obtained when the additive comprises from 0.02 to 0.15 percent. The quantity of metal oxide that may be added may range between 0.01 and 5.0 percent, by weight, and a range of 0.05 to 2.0 percent constitutes a preferred embodiment of this invention.

Though the nature of the relationship between the phosphite additive and the metal oxide is not fully understood, it has been found that physical properties of the polycarbonate, such as melt viscosity, are reduced by about a third when the phosphite or mixture of organic phosphite and epoxidized carboxylate is present along with the metal oxide. On the other hand, when either the phosphite additive or the metal oxide is present in the polycarbonate alone, reductions in melt viscosity of up to 300 percent have been found to occur. It has been found that the maximum benefit to physical properties is achieved with a concentration of phosphite or phosphite-carboxylate composition ranging between approximately 0.05 to 0.15 weight percent when the metal oxide concentration varies between 0.05 and 2.0 percent. When the concentration of phosphite composition exceeds this value, the physical properties drop off slightly, but further improvements are realized in heat and light stability.

The following examples are illustrative of the various aspects of the present invention, but are not to be construed as limiting in any way. All percentages are by weight.

EXAMPLE 1

In this example, six samples were prepared using a polycarbonate derived from 2,2'-bis-(4-hydroxyphenyl)-propane having an intrinsic viscosity of 0.571 dl./g. (deciliters per gram) as measured in p-dioxane at 30° C. and 0, 0.02, 0.05, 0.10, 0.15, and 0.25, respectively, of an additive consisting of a mixture of 1 part diphenyldecyl phosphite, 1 part triphenyl phosphite, 2 parts phenyldidecyl phosphite, and 8 parts of 3,4-epoxycyclohexylmethyl-3,4-cyclohexane carboxylate. Samples were prepared by mixing 1,000 g. of the dried polycarbonate with an appropriate amount of the phosphite additive. The mixtures were passed through a 2 zone extruder wherein the first zone was maintained at 525° F. and the second zone was maintained at 560° F. The extruded strands were then cut into pellets utilizing a strand chopper and injection molded into bars at 650° F.

The effect of the phosphite additive on the melt viscosity of the polycarbonate resin was determined. The following results were obtained:

TABLE I

Effect of phosphite-carboxylate additive on melt viscosity of polycarbonate

| Concentration of phosphite additive (wt. percent) | Melt viscosity, poises |
|---|---|
| 0 | 5100 |
| 0.02 | 5100 |
| 0.05 | 5060 |
| 0.10 | 4600 |
| 0.15 | 4120 |
| 0.25 | 3460 |

From the above data, it can be seen that substantially little change in melt viscosity takes place between polycarbonate free of the phosphite additive and polycarbonate containing 0.05 percent of the additive. However, when the concentration exceeds 0.05 percent, melt viscosity begins to drop off and is substantially reduced at concentrations containing 0.25 percent.

The intrinsic viscosity of each of the samples, after heating for 20 minutes at a temperature of 600° F., was measured by dissolving in p-dioxane maintained at 30° C. The following results were obtained:

TABLE II

Effect of phosphite-carboxylate additive on intrinsic viscosity of polycarbonate

| Concentration of phosphite additive (wt. percent) | Intrinsic viscosity (dl./g.) |
|---|---|
| 0 | 0.547 |
| 0.02 | 0.545 |
| 0.05 | 0.540 |
| 0.10 | 0.530 |
| 0.15 | 0.521 |
| 0.25 | 0.499 |

Intrinsic viscosity decreases with increasing concentrations of additive; however, it is only at the higher concentrations that the intrinsic viscosity is substantially decreased.

To determine the effectiveness of the additive, APHA solution colors were determined for each of the above-noted samples. Color was determined by oven aging ⅛" chips of the samples in an air circulating oven maintained at 125° C. for times ranging up to 250 hours. Changes in color due to oven aging were measured using a tristimulus colorimeter. APHA solution colors were determined by converting the molded color values to solution color values employing an empirical relationship between the two. Using these procedures, the results set forth in Table III, below, were obtained:

TABLE III.—COLOR OF POLYCARBONATE DUE TO OVEN AGING AT 125° C.

| Time of exposure (hrs.) | No additive | 0.05% additive | 0.15% additive | 0.25% additive |
| --- | --- | --- | --- | --- |
| 0 | 70 | 61 | 74 | 83 |
| 22 | 70 | 65 | 61 | 63 |
| 45 | 79 | 70 | 65 | 74 |
| 68 | 92 | 74 | 72 | 79 |
| 141 | 134 | 87 | 90 | 101 |
| 186 | 149 | 92 | 98 | 109 |
| 234 | 167 | 98 | 109 | 120 |
| 298 | 180 | 107 | 123 | 134 |

When the polycarbonate sample was heat aged at 125° C. for 298 hours, a substantial change in color resulted due to the chemical changes taking place within the polycarbonate. However, with only 0.05 percent additive, the degree of color change was considerably reduced. With concentrations in excess of 0.05 percent, color change was more pronounced indicating that the 0.05 percent level was optimum for this particular composition.

EXAMPLE 2

In this example, three samples were prepared using a polycarbonate derived from 2,2'-bis-(4-hydroxyphenyl)-propane having an intrinsic viscosity of 0.641 dl./g. as measured in p-dioxane at 30° C. All of the samples were free of phosphite additive but contained 0, 1.0, and 2.0 percent titanium dioxide, respectively. All samples were prepared in the same manner as in Example 1. The melt viscosity of the polycarbonate containing 2 percent titanium dioxide was reduced to approximately 4560 poise. The melt viscosity of the powder free of titanium dioxide was approximately 9740 poise. Thus, it can be seen that the addition of titanium dioxide causes substantial degradation of the polymer and when the content is as high as 2 percent, the melt viscosity is reduced in excess of 50 percent.

EXAMPLE 3

In this example, samples were prepared using a polycarbonate derived from 2,2'-bis-(4-hydroxyphenyl)-propane having an intrinsic viscosity of approximately 0.670 dl./g. as measured in p-dioxane at 30° C. Samples were prepared containing various quantities of the phosphite-carboxylate additive of Example 1 with and without 2 percent titanium dioxide pigment. The titanium dioxide employed was a fine powder pigment obtained from Du Pont and identified as R–500. The samples were prepared by drying the polycarbonate in powder form in an air circulating oven at 125° C. for a period of approximately 12 hours. Thereafter, specimens were prepared from 1000 g. samples of the polycarbonate mixed with the appropriate quantity of the phosphite additive and/or titanium dioxide. The blends of the polycarbonate composition were extruded at a temperature of approximately 550 to 560° F. The extruded strands were chopped in a strand chopper and melt viscosity and intrinsic viscosity of the pellets were measured using the procedure set forth in Example 1. The results obtained are set forth in Table IV as follows:

TABLE IV.—POLYCARBONATE CONTAINING PHOSPHITE-CARBOXYLATE ADDITIVE AND TITANIUM DIOXIDE

| Composition, wt. percent | | Melt viscosity (poise) | Intrinsic viscosity [1] (dl./g.) |
| --- | --- | --- | --- |
| Additive | TiO₂ | | |
| 0 | 0 | 10,000 | |
| 0.05 | 0 | 9,500 | |
| 0.15 | 0 | 8,320 | |
| 0 | 2.0 | 3,950 | 0.51 |
| 0.05 | 2.0 | 4,330 | 0.53 |
| 0.10 | 2.0 | 5,710 | 0.54 |
| 0.15 | 2.0 | 7,470 | 0.56 |
| 0.20 | 2.0 | 6,150 | 0.56 |
| 0.25 | 2.0 | 5,200 | 0.55 |

[1] Measured after 20 minutes at 600° F.

From the above table, it is apparent that melt viscosity of the polycarbonate composition containing only phosphite-carboxylate additive falls off as the additive content increases. It is also apparent that when the polycarbonate composition is free of additive, but contains 2.0 percent titanium dioxide, the melt viscosity of the polycarbonate composition is greatly reduced. When the phosphite-carboxylate additive is added to the polycarbonate composition containing 2 percent, by weight, titanium dioxide, interaction takes place between the components of the composition causing melt viscosity to increase to a peak at approximately 0.15 percent phosphite additive and 2.0 percent titanium dioxide. Thereafter, the melt viscosity begins to decrease. However, it should be noted that the composition containing 0.15 percent phosphite additive and 2.0 percent titanium dioxide has a melt viscosity almost double that of the composition containing only 2.0 percent titanium dioxide. This increase in melt viscosity with increasing phosphite additive content clearly indicates that an interaction takes place between the components of the composition.

The pellets from the above formulations were injection molded into test bars at 650° F. The yellowness index of the molded bars was measured. The yellowness index is a measure of the degree of yellowness under daylight illumination of homogeneous, non-fluorescent, nearly colorless or nearly white translucent or opaque plastics. It was determined using the tristimulus colorimeter of Example 1 with magnesium oxide as the basis for comparison. The procedure set forth in ASTM (D–1925) 27 was followed. The results are set forth in the following table:

TABLE V.—YELLOWNESS INDEX OF POLYCARBONATES

| Composition, wt. percent | | Yellowness index |
| --- | --- | --- |
| Phosphite additive | TiO₂ | |
| 0 | 2 | 15.4 |
| 0.05 | 2 | 13.4 |
| 0.10 | 2 | 11.7 |
| 0.15 | 2 | 11.1 |
| 0.20 | 2 | 10.1 |
| 0.25 | 2 | 9.8 |

It is apparent that molding at a temperature of 650° F. causes substantial darkening of the sample free of phosphite-carboxylate additive. However, as the concentration of additive increases, darkening decreases and with concentrations of additive at 0.25 percent, the yellowness index was only 9.8.

EXAMPLE 4

In this example, the procedure of Example 3 was repeated. Samples were prepared with 0, 0.03, 0.06, and 0.09 percent phosphite-carboxylate additive and 1 and 2 percent titanium dioxide. Melt viscosity was measured and the following results obtained:

TABLE VI.—MELT VISCOSITY OF POLYCARBONATE CONTAINING PHOSPHITE-CARBOXYLATE ADDITIVE AND TITANIUM DIOXIDE

| Composition, wt. percent | | Melt viscosity (poise) |
| --- | --- | --- |
| Phosphite additive | TiO₂ | |
| 0 | 1 | 5,890 |
| 0.03 | 1 | 6,780 |
| 0.06 | 1 | 9,380 |
| 0.09 | 1 | 8,740 |
| 0 | 2 | 4,560 |
| 0.03 | 2 | 5,000 |
| 0.09 | 2 | 5,950 |

Again, as the phosphite-carboxylate content increases, interaction between the components of the composition takes place causing increases in melt viscosity.

EXAMPLE 5

Samples were prepared using a polycarbonate derived from 2,2'-bis-(4-hydroxyphenyl)-propane having an intrinsic viscosity of 0.58 dl./g. as measured in p-dioxane at 30° C. The phosphite additive consisted of a mixture of phosphites consisting of 1 part triphenylphosphite, 1 part phenyldidecylphosphite, and 2 parts diphenyldecylphosphite. The total composition consisted of 98.85 percent polycarbonate, 0.15 percent phosphite additive and 1 percent titanium dioxide. The ingredients were blended together and passed through a two zone extruder. The first stage of the extruder was maintained at 500° F. and the second stage was maintained at 560° F. The extruded strand was passed through a strand chopper and chopped into pellets. The intrinsic viscosity of the pellets was found to be 0.55 dl./g. as measured in p-dioxane at 30° C. The remaining pellets were injection molded at a temperature of 650° F. The melt viscosity of the pellets were found to be 4660 poise. The yellowness index of the test bar was found to be 6.8. The test bar was then heated in an air circulating oven maintained at 150° C. for 48 hours. The yellowness index was then measured and found to be 10.4.

EXAMPLE 6

In this example, 8 samples were prepared using the ingredients of Example 5. For all samples, 1000 g. of the polycarbonate powder were heated overnight at 125° C., mixed with the appropriate quantity of phosphite and pigment for 5 minutes in a stainless steel jar with a paint shaker and extruded at 530° F. in a 1½ inch extruder. The extruder strands were chopped into pellets in a strand chopper and injection molded at 650° F. Melt viscosity for the pellets was determined at 600° F. and molded color, i.e., yellowness index, was measured in the as-molded condition as well as after heat aging at 150° C. for 48 hours. The results obtined are set forth in Table VII as follows:

TABLE VII.—PROPERTIES OF POLYCARBONATE CONTAINING PHOSPHITE ADDITIVE AND TITANIUM DIOXIDE

| Composition, wt. percent | | Melt viscosity (poises) | Yellowness index | |
|---|---|---|---|---|
| Phosphite additive | TiO₂ | | As molded | After aging |
| 0.05 | 0 | 3,700 | (¹) | (¹) |
| 0.05 | 0.5 | 3,890 | 11.4 | 16.8 |
| 0.10 | 0.5 | 3,420 | 7.6 | 12.4 |
| 0.15 | 0.5 | 3 600 | 6.7 | 12.0 |
| 0.05 | 1.5 | 2,360 | 9.1 | 12.6 |
| 0.10 | 1.5 | 3,240 | 7.4 | 12.6 |
| 0.15 | 1.5 | 3,250 | 6.5 | 10.3 |
| 0.20 | 1.5 | 3,110 | 5.2 | 10.0 |

¹ Value not measured.

The results of the above test indicate that the combination of phosphite additive and titanium dioxide not only arrests degradation of physical properties in the polycarbonate composition, but also increases the resistance of the composition to yellowing.

EXAMPLE 7

In this example, a gray polycarbonate composition was prepared. The polycarbonate was derived from 2,2'-bis-(4-hyrdoxyphenyl)-propane having an intrinsic viscosity of 0.53 dl./g. as measured in p-dioxane at 30° C. The composition contained 0.01 percent of carbon black, 1.00 percent titanium dioxide, and 0.05 percent of a phosphite-carboxylate additive consisting of 1 part triphenylphosphite, 1 part diphenyldidecylphosphite, 2 parts phenyldidecylphosphite, and 8 parts, 3,4-epoxycyclohexylmethyl-3,4-cyclohexane carboxylate. The sample was prepared by blending the components in a paint shaker and extruding the mixture. The extruded strand was chopped into pellets and injection molded at 650° F. The melt viscosity of the pellets was found to be 3710 poise at 600° F.

EXAMPLE 8

In this example, two additional gray sampls were prepared using the procedure of Example 7. A polycarbonate derived from 2,2'-bis-(4-hydroxyphenyl)-propane having an intrinsic viscosity of 0.53 dl./g. as measured at 30° C. in p-dioxane was used. The compositions each contained 0.01 percent carbon black and 1.00 percent titanium dioxide. Each sample contained a phosphite additive consisting of 1 part triphenylphosphite, 1 part diphenyldecylphosphite, and 2 parts phenyldidecylphosphite. The samples contained 0.05 percent and 0.10 percent of the phosphite additive, respectively. The sample containing 0.05 percent phosphite additive had a melt viscosity at 600° F. poise and that with 0.10 percent phosphite additive had a melt viscosity of 3700 poise.

EXAMPLE 9

Using the procedure of Example 7, a yellow polycarbonate composition was prepared. The polycarbonate was one derived from 2,2'-bis-(4-hydroxyphenyl)-propane and had an intrinsic viscosity of 0.58 dl./g. as measured at 30° C. in p-dioxane. The composition contained 0.05 percent of the phosphite-carboxylate composition of Example 7, 0.40 percent titanium dioxide, and 0.60 percent cadmium yellow. A melt viscosity of 5480 poise was found for the pellets at 600° F.

EXAMPLE 10

Two more yellow polycarbonate samples were prepared using the procedure of Example 7. The polycarbonate, titanium dioxide and cadmium yellow were the same as in Example 9 and employed in the same concentrations. The samples contained 0.05 and 0.10 percent, respectively, of a phosphite additive consisting of 1 part triphenylphosphite, 1 part phenyldecylphosphite, and 2 parts phenyldidecylphosphite. The sample containing 0.05 percent phosphite additive had a melt viscosity at 600° F. of 5780 poise and that containing 0.10 percent additive had a melt viscosity of 5480 poise.

EXAMPLE 11

In this example, a blue polycarbonate composition was prepared using the procedure of Example 7. The polycarbonate was one derived from 2,2'-bis-(4-hydroxyphenyl)-propane having an intrinsic viscosity of 0.53 dl./g. as measured in p-dioxane at 30° C. The composition contained 0.05 percent of the phosphite-carboxylate additive of Example 7, 0.55 percent titanium dioxide and 0.48 percent ultramarine blue. A melt viscosity of 2830 poise was found for the pellets at 600° F.

EXAMPLE 12

Two additional blue polycarbonate formultaions were prepared using the procedure of Example 7. The polycarbonate, titanium dioxide and ultramarine blue were the same as in Example 11 and employed in the same concentrations. The samples contained 0.05 and 0.10 percent, respectively, of a phosphite additive consisting of 1 part triphenylphosphite, 1 part diphenyldecylphosphite, and 2 parts phenyldidecylphosphite. The sample containing 0.05 percent phosphite additive had a melting viscosity of 2920 poise at 600° F. and that containing 0.10 percent additive had a melt viscosity of 2880 poise.

EXAMPLE 13

In this example, three green polycarbonate samples were prepared. The polycarbonate used was one derived from 2,2'-bis-(4-hydroxyphenyl)-propane. The compositions contained 0.81 percent titanium dioxide, 0.09 percent phthalocyanine and a phosphite-carboxylate additive consisting of 1 part triphenylphosphite, 1 part diphenyldecylphosphite, 2 parts phenyldidecylphosphite, and 8 parts 3,4-epoxycyclohexylmethyl - 3,4 - cyclohexane carboxylate. The samples contained 0.05 percent, 0.10 percent and 0.15 percent of the phosphite-carboxylate additive, respectively. The melt viscosity of the pellets was found to be 4630 poise at 600° F. for the sample containing 0.05 percent additive, 4940 for the sample containing 0.10 percent additive, and 4360 for the sample containing 0.15 percent additive.

EXAMPLE 14

Samples were prepared from a polycarbonate derived from 2,2'-bis-(4-hydroxyphenyl)-propane having an intrinsic viscosity of 0.565 dl./g. as measured in p-dioxane at 30° C., 1 percent titanium dioxide, and 0.1 percent phosphite additive. Various organic phosphites were employed. Samples were prepared by blending the components of the composition and passing the mixture through an extruder at a temperature of 560° F. The extruded strands were chopped into pellets and injection molded at 650° F. and 1200 p.s.i. Melt viscosities of the compositions were determined at 600° C. The following results were obtained:

TABLE VIII

Melt viscosity of polycarbonate compositions containing $T_iO_2$ and phosphite additive

| Additive composition: | Melt viscosity (poise) |
|---|---|
| 1 part triphenylphosphite, 1 part diphenyldecylphosphite, 2 parts phenyldidecylphosphite_ | 4600 |
| Diphenylhexylphosphite | 4660 |
| Trilaurylphosphite | 4700 |
| Triphenylphosphite | 3120 |
| Control (no stabilizer and no pigment) | 4880 |

From the above, it is apparent that phosphites used alone and in combination interact with the other components of the polycarbonate composition to arrest degradation caused by addition of a metal oxide pigment.

EXAMPLE 15

In this example, a sample was prepared according to the procedure set forth in Example 8. The polycarbonate employed was one derived from 2,2'-bis-(4-hydroxyphenyl)-propane having an intrinsic viscosity of 0.53 dl./g. as measured in p-dioxane at 30° C. The pigment was a finely divided zinc oxide and the additive consisted of 1 part triphenylphosphite, 1 part diphenyldecylphosphite, 2 parts phenyldidecylphosphite, and 8 parts, 3,4-epoxycyclohexylmethyl-3,4-cyclohexane carboxylate. The melt viscosity of the sample was found to be 3920 poise and the yellowness index, as molded, was found to be 17.1. After aging for 48 hours at 150° C., the yellowness index was found to be 30.5.

EXAMPLE 16

In this example, two samples were prepared using the polycarbonate and zinc oxide of Example 9 and an additive consisting of 1 part triphenylphosphite, 1 part diphenyldecylphosphite, and 2 parts phenyldidecylphosphite. The total phosphite content was 0.05 and 0.10 percent for each of the samples, respectively. The melt viscosity at 600° F. of the sample containing 0.05 percent additive was 4240 and that containing 0.10 percent additive was 3910 poise. Yellowness index of the sample in the as-molded condition containing 0.05 percent additive was found to be 16.4. The yellowness index for the sample containing 0.10 percent additive was found to be 11.9. After aging for 48 hours at 150° C., the yellowness index of the sample containing 0.05 percent additive was 29.0 and for that containing 0.10 percent additive 26.6. It can be readily seen that increasing the quantity of additive increased the color stability of the polycarbonate.

The foregoing disclosure of this invention is not to be considered as limiting since many variations may be made by those skilled in the art without departing from the scope or spirit of the foregoing description. For example, in addition to the stabilizer and metal oxide additives, there may be also added plasticizers, fillers, etc.

What I claim as new and desire to secure by Letters Patent of the United States is:

1. A stable, pigmented polymeric composition comprising:
 (a) a polycarbonate of the formula

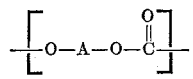

wherein A is an aromatic radical;
 (b) 0.01 to 5.0 weight percent of a metal oxide pigment able to withstand temperatures in excess of 200° F. and
 (c) 0.01 to 0.30 weight percent of an additive selected from the group consisting of an organic phosphite and a mixture of organic phosphites, and
 (d) 0.01 to 0.25 weight percent of an epoxidized dicycloalkyl carboxylate provided the total concentration of organic phosphite and epoxidized carboxylate does not exceed 0.40 percent.

2. The composition of claim 1 wherein the organic phosphite and the mixture of organic phosphites is selected from the group consisting of

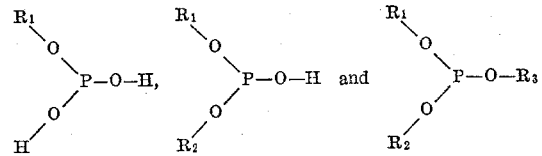

wherein $R_1$, $R_2$ and $R_3$ are hydrocarbon radicals having from 1 to 25 carbon atoms.

3. The composition of claim 1 wherein the pigment is titanium dioxide.

4. The composition of claim 3 wherein the titanium dioxide constitutes from 0.05 to 2.0 weight percent of the total composition.

5. The composition of claim 1 wherein the pigment is zinc oxide.

6. The composition of claim 1 wherein the organic phosphite constitutes from 0.02 to 0.15 weight percent of the total composition.

7. The composition of claim 1 wherein the organic phosphite additive consists of a mixture of 1 part didecylphenylphosphite, 1 part triphenylphosphite and 2 parts diphenyldecylphosphite.

8. The composition of claim 1 wherein the epoxidized carboxylate is 3,4-epoxycyclohexylmethyl-3,4-epoxycyclohexane carboxylate.

9. The composition of claim 1 wherein the organic phosphite is triphenylphosphite.

10. The composition of claim 1 wherein the polycarbonate is derived from 2,2' - bis - (4 - hydroxyphenyl)-propane.

11. The composition of claim 1 including a colorant in addition to the metal oxide.

References Cited

UNITED STATES PATENTS

| 3,186,961 | 6/1965 | Sears | 260—45.8 |
| 3,189,570 | 6/1965 | Paulin et al. | 260—45.8 |
| 3,274,156 | 9/1966 | Perry et al. | 260—45.8 |

FOREIGN PATENTS

| 727,700 | 2/1966 | Canada. |
| 254,892 | 10/1964 | Australia. |

MORRIS LIEBMAN, Primary Examiner

L. T. JACOBS, Assistant Examiner

U.S. Cl. X.R.

260——45.7